Patented Feb. 11, 1941

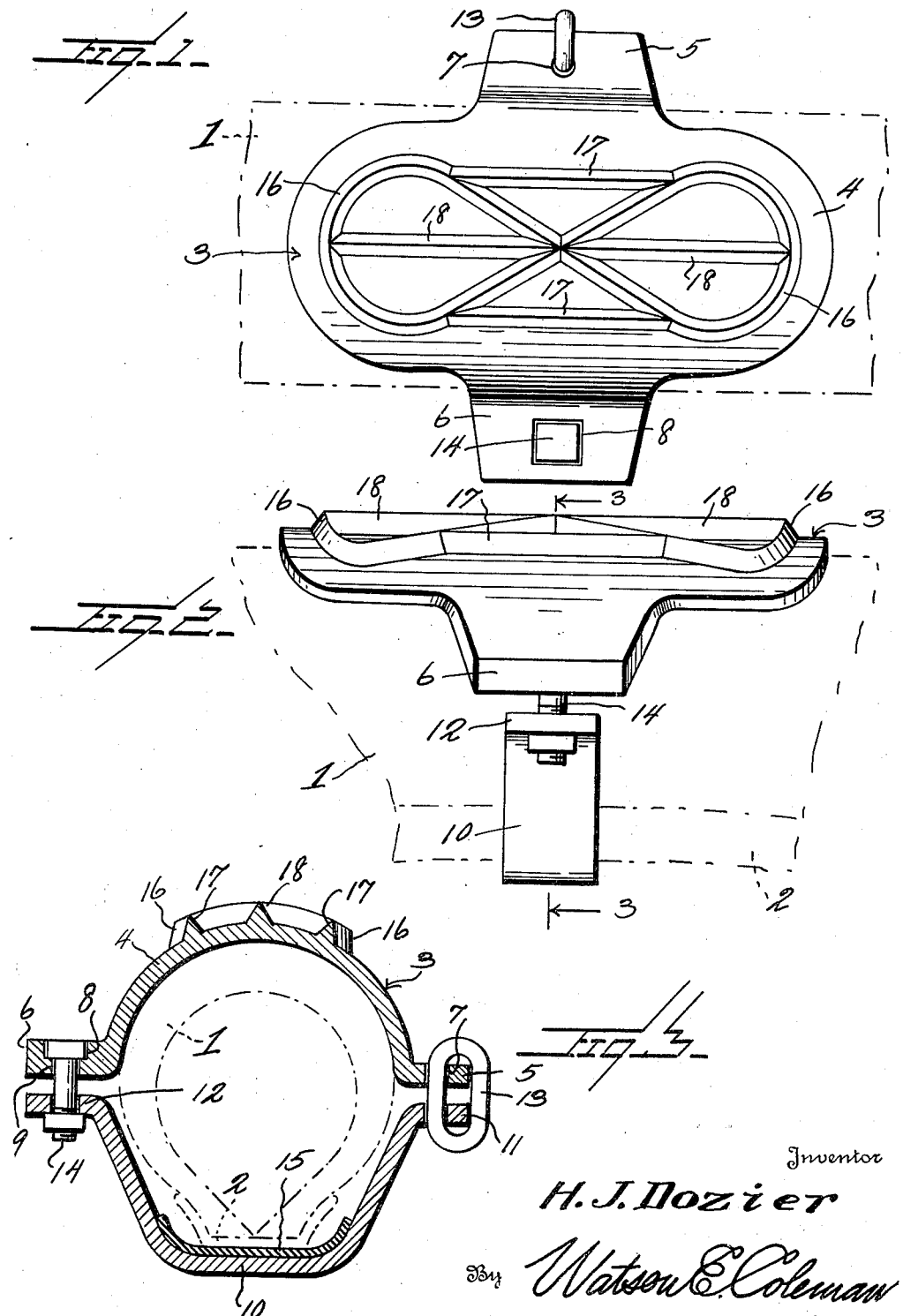

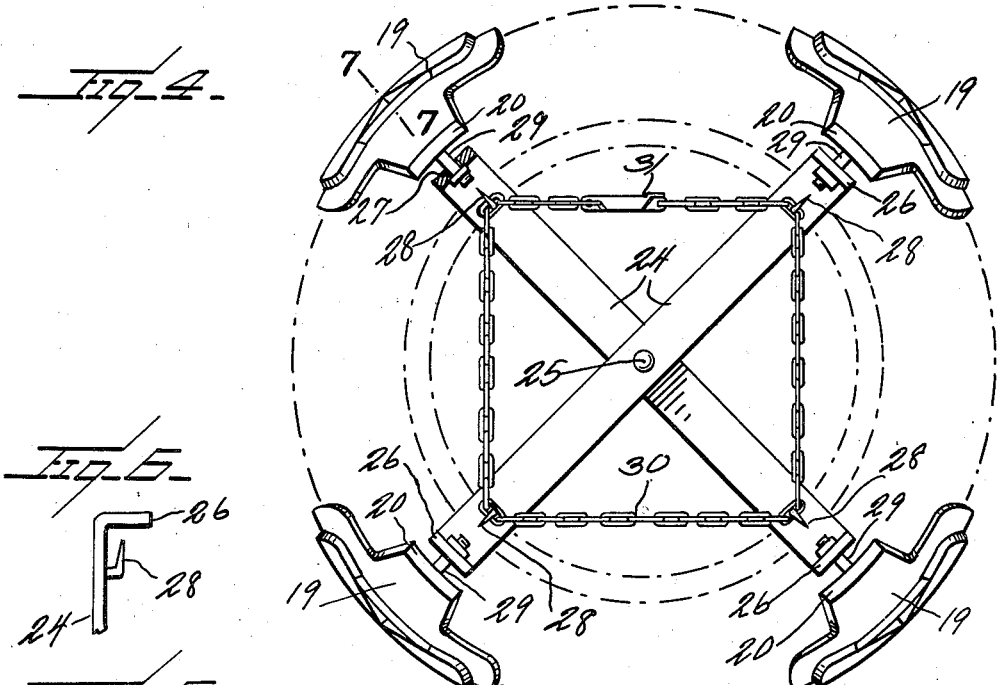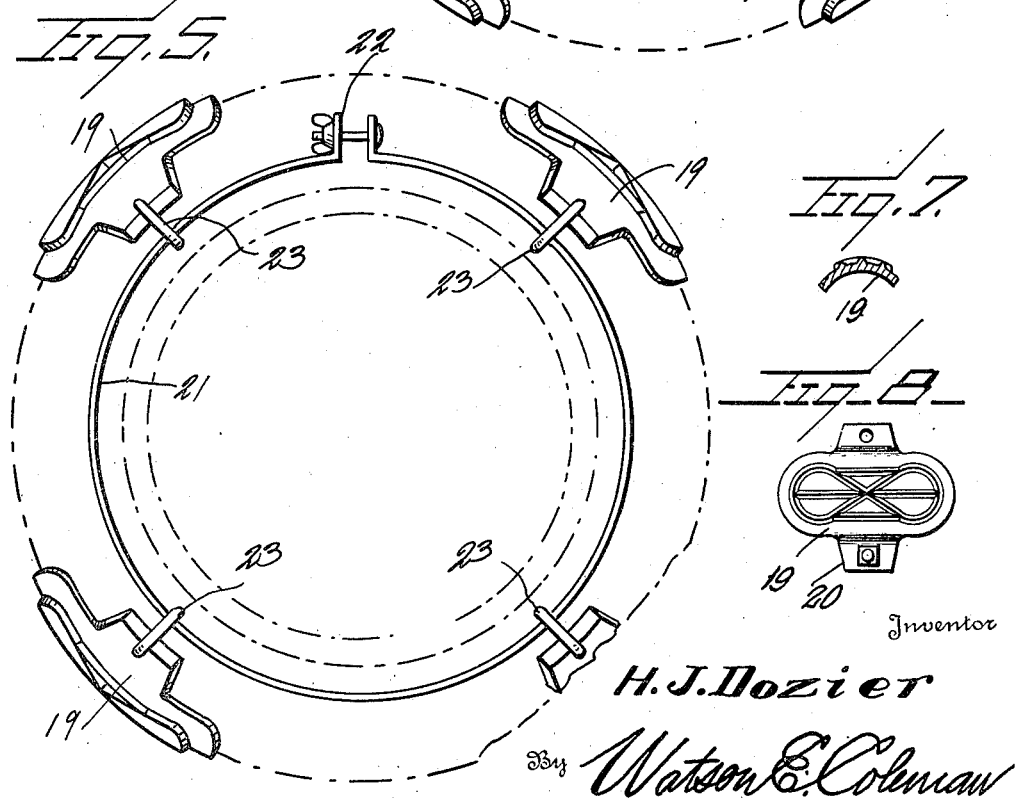

2,231,113

UNITED STATES PATENT OFFICE 2,231,113

TRACTION SHOE FOR TIRES

Henry J. Dozier, Philadelphia, Pa.

Application March 16, 1939, Serial No. 262,293

3 Claims. (Cl. 152—226)

This invention relates to improvements in antiskid devices for use upon vehicle wheels and particularly pneumatic or other types of tires used upon motor vehicles.

The present invention has for its primary object to provide an improved traction shoe for motor vehicle tires which is so designed that positive starting or stopping of the motor vehicle which has its wheels equipped with this device, may be accomplished even though such wheels may be standing on icy surfaces as the shoes are provided upon their ground engaging sides or faces with a novel rib formation which will prevent the shoe from slipping longitudinally with respect to the vehicle or laterally.

Another object of the invention is to provide a wheel traction shoe having novel means for securing it in position against the tread of a tire.

Still another object of the invention is to provide an improved vehicle tire traction increasing device having novel means for adapting it to a disk wheel.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in plan of the ground engaging base of a traction shoe constructed in accordance with the present invention.

Fig. 2 is a view in side elevation of the same showing the attaching means.

Fig. 3 is a sectional view on the line 3—3 of Fig. 2.

Fig. 4 is a view illustrating the outside connecting means for a series of plates when used on a disk wheel.

Fig. 5 shows the inside connecting means for the plates when mounted on a disk wheel.

Fig. 6 is a detailed view of the chain engaging spur of a bar.

Fig. 7 is a partial transverse section through one of the traction plates shown in Figs. 4 and 5, taken substantially on the line 7—7 of Fig. 4.

Fig. 8 is a view in plan of one of the traction plates of Figs. 4 and 5.

In the description of the invention, reference will first be made to the form of the invention illustrated in Figs. 1 to 3, which is designed for use upon wheels having spokes. The modified form of the device hereinafter described is designed particularly for application to disk wheels.

In referring to the form of the device designed to be applied to spoked wheels, the numeral 1 generally designates a wheel tire supported upon the usual felly 2. The shoe embodying the present invention is indicated generally by the numeral 3 and each wheel is equipped with four or more of these shoes spaced equi-distantly thereabout.

Each shoe comprises an elongated trough-like body 4 of metal which is shaped to conform to the curvature of the tire over the tread of which it is to be placed. The side walls of this trough-like body are extended to form the upwardly and outwardly projecting ears 5 and 6. Such ears are located substantially at the longitudinal center of the body 4 and the ear 5 is provided with an aperture 7 while the ear 6 is provided upon its outer face with a bolt head receiving recess 8 which leads into a bolt aperture 9.

The metal body 4 is maintained in place by a cross connecting securing strap 10 which is of arcuate form, as shown, and terminates at each end in the laterally extending portions 11 and 12. The portion 11 is provided with a suitable aperture and is joined with the portion 5 of the body 4 by a link 13 which passes through the aperture 7 of the traction body. The portion 12 of the connecting strap 10 is likewise apertured to receive a bolt 14, the head of which is located in the recess 8 in the adjacent ear of the traction body.

Secured to the inner or concave side of the connecting strap 10 is a strip of resilient material such as rubber or the like, as indicated at 15. This material serves as a guard to prevent the strap marring the finish of the wheel felly.

The traction face of the body 4 has formed integral therewith a triangular metal rib which is generally in the form of a figure 8, as indicated at 16, this rib or figure extending lengthwise of the traction body. Between the enlarged ends of the figure 8 rib are the longitudinally extending side ribs 17 of the same cross-sectional design and within the loops of the main rib are longitudinally extending centrally disposed ribs 18, also of triangular form.

In applying the traction plates 4, the ends of the securing strap 10 are maintained slightly in spaced relation with the ears 5 and 6 as illustrated, so that play may be taken up, if necessary. From the foregoing, it will be readily apparent that when a vehicle wheel is equipped with a group of the traction plates of the type described, no difficulty will be experienced in attaining traction or in stopping the wheel even though the same may be running upon an icy surface as the looped ends of the figure 8 rib will effectively cut into any icy surface and the longitudinal ribs 17 and 18, working in conjunction with the main rib, will also operate effectively to prevent side slip.

For the attachment of the traction plates to wheels having disk centers instead of spokes, the mechanism shown in Figs. 4 to 6 is provided. This mechanism as shown, is designed for the use of four traction plates each of which is indicated generally by the numeral 19, and is of exactly the same construction as the plates 3 and, therefore, it is not believed necessary to describe the same in detail other than to indicate by the numerals 20, the lateral ears of the sides of the plate, for facilitating subsequent description.

In securing the plates 19 to a wheel, there is provided a split ring 21 which encircles the vehicle axle and is disposed at the inner side of the wheel. This split ring is provided with a suitable means for connecting the ends together, as indicated at 22, and disposed at equidistantly spaced intervals around the ring are links 23, corresponding with the links 13, each of which engages through the aperture of an ear 20 of a traction shoe or plate.

For positioning against the outer side of the wheeled disk, there are provided two crossed bars 24, which are secured together intermediate their ends, as indicated at 25, and each of these bars at its end is turned outwardly to form the toe 26, which is provided with a bolt aperture 27. Upon the outer face of each bar 24 adjacent the toe 26, there is secured an outwardly directed spur 28. The ears 20 at the outer sides of the traction shoes or plates 19 are coupled with the toes 26 of the crossed bars 24 by bolts 29, these bolts having their heads countersunk into the ears of the shoes or plates, as described in connection with the shoe 3.

In order to maintain the shoes in the desired spaced positions around the tire, the spurs 28 of the crossed bars 24 are coupled together by a chain 30, each spur having a link of the chain engaged thereover and this chain may have its ends coupled together by a latch mechanism 31 of the type commonly employed for connecting the ends of the well known skid chains.

From the foregoing, it will be readily apparent that when the shoes are placed in position upon a tire mounted upon a disk wheel and the securing elements comprising broadly the split ring 21 and the crossed arms 24 are placed in connection therewith, the shoes will be firmly held in position and will operate efficiently in giving traction to or in assisting in stopping of rotation of the wheel on which they are mounted.

What is claimed is:

1. Traction increasing and anti-skid means for a vehicle wheel, comprising a plurality of elongated plate members each being longitudinally arcuately formed to receive the tread portions of the wheel, each of said plate members having a laterally projecting ear at the central part of each side edge thereof, said plate members being disposed upon the wheel in oppositely arranged pairs, a ring member disposed at one side of the wheel and concentrically therewith, means coupling said ring member with the adjacent plate ears, a pair of crossed bars disposed at the opposite side of the wheel from the ring, each bar extending between ears of oppositely disposed pairs of plates, and means coupling the ends of the bars with the adjacent plate ears.

2. Traction increasing and anti-skid means for a vehicle wheel, comprising a plurality of elongated plate members each being longitudinally arcuately formed to receive the tread portion of the wheel, each of said plate members having a laterally projecting ear at the central part of each side edge thereof, said plate members being disposed upon the wheel in oppositely arranged pairs, a ring member disposed at one side of the wheel and concentrically therewith, means coupling said ring member with the adjacent plate ears, a pair of crossed bars disposed at the opposite side of the wheel from the ring, each bar extending between ears of oppositely disposed pairs of plates, each of said bars having a terminal outwardly extending toe portion arranged in opposed relation with the adjacent plate ear, coupling means between each toe portion of each bar and the adjacent plate ear, and a bracing connection between the outer ends of the bars whereby the bars are maintained in right angular crossed relation.

3. Traction increasing and anti-skid means for a vehicle wheel, comprising a plurality of elongated plate members each being longitudinally arcuately formed to receive the tread portion of the wheel, each of said plate members having a laterally projecting ear at the central part of each side edge thereof, said plate members being disposed upon the wheel in oppositely arranged pairs, a ring member disposed at one side of the wheel and concentrically therewith, means coupling said ring member with the adjacent plate ears, a pair of crossed bars disposed at the opposite side of the wheel from the ring, each bar extending between ears of oppositely disposed pairs of plates, each of said bars having a terminal outwardly extending toe portion arranged in opposed relation with the adjacent plate ear, coupling means between each toe portion of each bar and the adjacent plate ear, a spur member carried by each bar at each end thereof, and a chain extending between and connecting the spurs of the bars and forming a bracing means to maintain said bars in their perpendicularly related relation.

HENRY J. DOZIER.